United States Patent [19]

Fuhrmann et al.

[11] 3,917,699

[45] Nov. 4, 1975

[54] PROCESS FOR THE PRODUCTION OF 2-AMINOCYCLOALKANONE OXIME

[75] Inventors: Robert Fuhrmann, Morris Plains; Fred W. Koff, Clifton; John Pisanchyn, Morristown, all of N.J.

[73] Assignee: Allied Chemical Corporation, New York, N.Y.

[22] Filed: Dec. 7, 1973

[21] Appl. No.: 422,952

[52] U.S. Cl. ............................................. 260/566 A
[51] Int. Cl.² ....................................... C07C 131/04
[58] Field of Search ............................... 260/566 A

[56] References Cited
UNITED STATES PATENTS
3,426,070   2/1969   Doi et al. ....................... 260/566 A

*Primary Examiner*—Gerald A. Schwartz
*Attorney, Agent, or Firm*—Arthur J. Plantamura

[57] ABSTRACT

2-Aminocycloalkanone oximes are produced by reacting, in an oxygen-free environment, hydroxylamine phosphate or hydroxylamine sulfate with anhydrous ammonia; removing the precipitated ammonium salt; adding ammonium chloride to the solution; maintaining the solution within a preselected temperature range while adding 2-chlorocycloalkanone; maintaining the desired temperature until the reaction is complete and isolating the oxime product.

8 Claims, 1 Drawing Figure

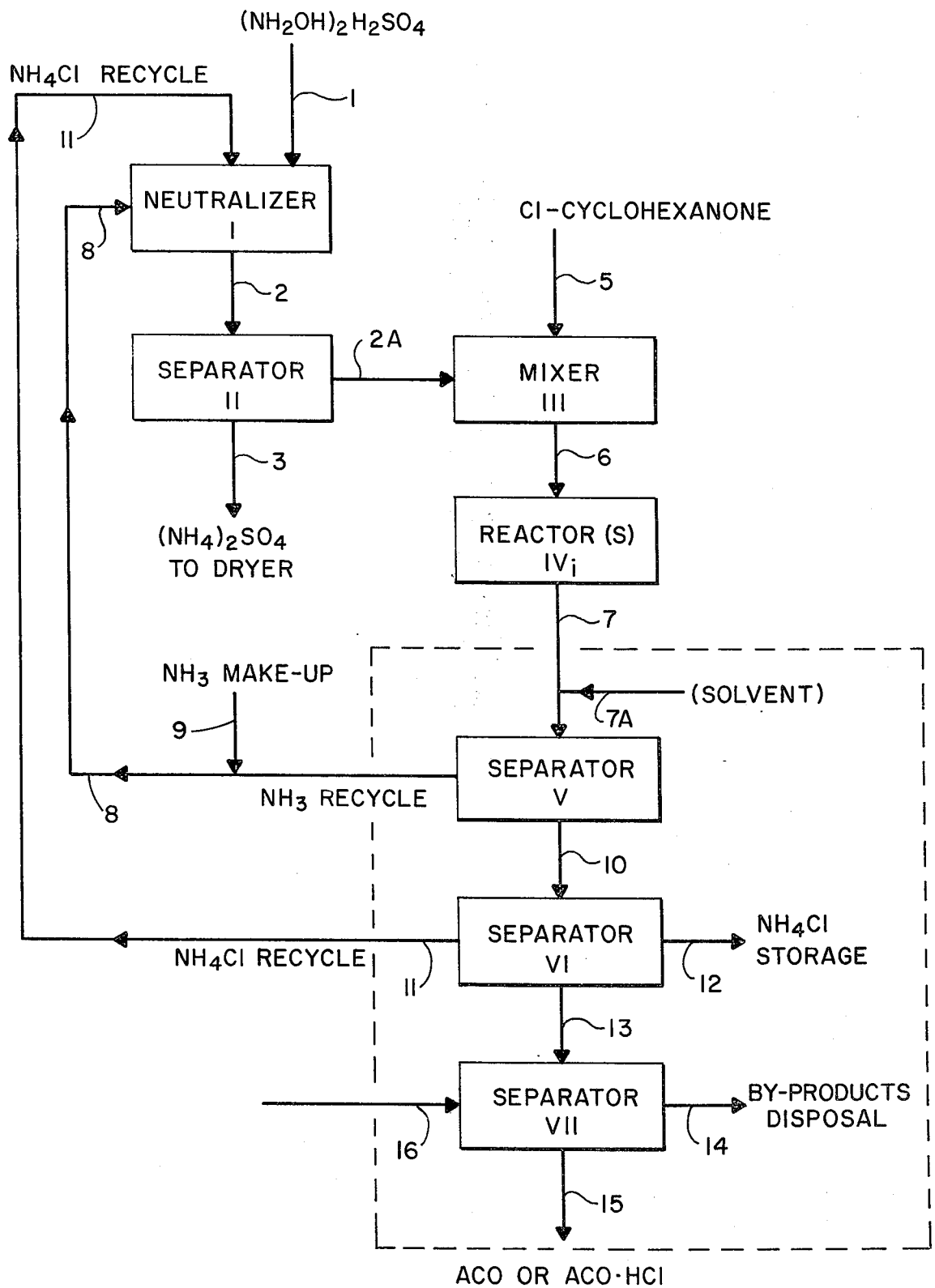

PROCESS FOR THE PRODUCTION OF 2-AMINOCYCLOALKANONE OXIME

BACKGROUND OF THE INVENTION

1. Field of the Invention

This invention is directed to a method for the production of high yields of 2-aminocycloalkanone oxime from 2-chlorocycloalkanones. In particular, 2-chlorocyclohexanone can be converted, using the method of the present invention, to 2-aminocyclohexanone oxime, a valuable intermediate in the synthesis of lysine.

2. Description of the Prior Art

In order to produce aminocycloalkanone oximes from cholorcyloalkanones it was believed necessary to form an aminocycloalkanone by amination and to oximate the intermediate thus formed to produce the desired oxime product. Hill et al. in Canadian Pat. No. 447,113 disclose that the oximation of ketones can be accomplished by dissolving the ketone in liquid ammonia and adding a hydroxylamine salt, thereby producing the corresponding ketoxime. Doi et al. in U.S. Pat. No. 3,426,070 disclose a one step method for aminating and oximating 2-chlorocyclohexanone to produce 2-aminocyclohexanone oxime by bringing the 2-chlorocyclohexanone into reaction with hydroxylamine sulfate or hydroxylamine free base obtained by neutralization of the sulfate, or preferably, with hydroxylamine hydrochloride, in the presence of liquid ammonia at reaction temperatures of 0°–132°C., preferably 60°–100°C., for reaction times of 15 minutes to 24 hours, preferably 30 minutes to 6 hours. In accordance with their preferred embodiment, Doi et al. use 1–15% of a polymerization inhibitor such as hydroquinone or pyrogallol to reduce the formation of the undesired by-products. The use of such inhibitors complicates the reaction system due both to the necessity of recycling unspent inhibitor and the necessity of insuring its complete elimination from the final product. Such complete removal from the final product is necessary since the presence of even trace amounts may cause undesirable biological effects, e.g. toxicity, if the product is to be used for nutritional purposes; moreover, the presence of trace amounts of inhibitor produces strong coloration in a number of subsequent reactions, as for example, the Beckmann rearrangement used to convert aminocyclohexanone oxime to aminocaprolactam.

Hydroxylamine hydrochloride, which Doi et al. indicate gives superior results, is not presently available on an industrial scale. In addition, at least 2 moles of the neutralization byproduct, NH$_4$Cl, are formed in the production of the oxime using hydroxylamine hydrochloride. Since this NH$_4$Cl has little commercial value and must be further processed before disposal to prevent pollution problems, the economic advantages to finding an alternative to the use of the hydrochloride system are obvious. There is therefore a need for a method for producing high yields of aminocycloalkanone oximes using economical, readily available materials, which produce co-products having increased marketability while limiting any undesirable by-product formation within the reaction system.

SUMMARY OF THE INVENTION

This invention is directed to the use of hydroxylamine phosphate or hydroxylamine sulfate with a 2-chlorocycloalkanone to produce the corresponding 2-aminocycloalkanone oximes or corresponding oxime hydrochlorides. The resulting 2-aminocycloalkanone oximes may be represented by the following formula:

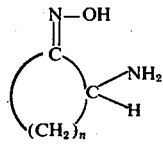

where $n$ is an integer of from 3 to 10.

The method of the present invention is particularly useful in the conversion of the 2-chlorocyclohexanone i.e. wherein $n$ is 4 in the above formula, to produce the corresponding compound, 2-aminocyclohexanone oxime.

We have found that the use of hydroxylamine phosphate or hydroxylamine sulfate results in high yields of a relatively pure crystalline product when the reaction is carried out under the specific conditions disclosed herein. An important attribute of the method of the present invention resides in the relatively ready availability of hydroxylamine phosphate and hydroxylamine sulfate. Hydroxylamine phosphate may be obtained by the reduction of nitrogen oxides in phosphoric acid while hydroxylamine sulfate may be prepared by reduction of nitrous oxide with ammonium sulfites or by hydrogenation of nitrous oxide in the presence of sulfuric acid. Moreover, the use of these two reactants in accordance with the method of the present invention results in the production of uncontaminated ammonium phosphate and ammonium sulfate, neutralization by-products having relaltively high commercial value with the recovery of only a minimum amount of NH$_4$Cl required.

We have found that the aforementioned high yields and ancillary advantages can be attained by admixing hydroxylamine phosphate or hydroxylamine sulfate with substantially anhydrous ammonia thus forming a precipitate of the corresponding ammonium phosphate or ammonium sulfate which is filtered from the system and recovered in useable form. In the resulting reactant solution substantially freed of precipitate and containing hydroxylamine in free base form in liquid ammonia, we add at least about 0.2 mol ammonium chloride per mol of chlorocycloalkanone. Suitably, the ammonium chloride is obtained by recycle from a later stage in the reaction system. Additionally, we establish in the hydroxylamine solution, a temperature usually in the range of about 60° to 105°C. and thereafter add the 2-chlorocycloalkanone to the hydroxylamine solution at this elevated temperature. Adequate heat exchange is provided throughout the subsequent reaction to maintain a temperature in the range of about 80° to 120°C. Since the reaction is exothermic, adequate cooling would be provided if the hydroxylamine solution is preheated directly to the reaction temperature or alternatively, the NH$_2$OH—NH$_3$—NH$_4$Cl can be fed at a lower temperature thus allowing the reaction exotherm to raise the temperature to the desired level. The corresponding 2-aminocycloalkanone oxime is readily produced.

The method of the present invention may be readily adapted to continuous operation by preheating the ammonia-hydroxylamine reactant solution in a zone separate from the 2-chlorocyclohexanone reactants, e.g. to a temperature in the range of 60° to 105°C.; vigorously mixing the reactants including the added ammonium chloride, preferably while minimizing backmixing after the initial homogenization of the reactants, in a first zone while maintaining the temperature of the resulting reaction mixture in the temperature range of about 80° to 120°C. until the extent of reaction is not more than 50% of completion and then passing the reaction mixture out of the first zone into one or more succeeding zones wherein back-mixing of the reaction mixture with the incoming chlorocycloalkanone chlorocycloalkanone entering the first zone is prevented and wherein the reaction mixture is maintained at a tempterature in the range of about 80° to 120°C. until the reaction is substantially complete. The product can then be recovered, as for example, by adding a solvent for the 2-aminocycloalkanone oxime in which ammonium chloride has only low solubility, separating the solid ammonium chloride from the product solution and recycling at least a portion of the separated ammonium chloride for addition to the reactant solution containing hydroxylamine in liquid ammonia.

Moreover, we have found that excellent yields can be obtained without the use of inhibitors, by rigorously excluding oxygen from the reaction mixture.

In accordance with the method of the present invention, we have found that the substantial reduction in by-product formation is attributable to the fact that this particular reaction system involves a number of competing reactions. Since the particular reaction rates vary at different temperatures, it is possible to minimize the undesired by-product formation by maintaining the reaction temperature within particular ranges, usually about 60° to 120°C., more especially about 80° to 105°C., the temperature range at which the oxime formation is favored. In addition to the beneficial effect on yields attained by using a preheated, oxygen-free system, we have found that the presence of the ammonium ion provided by the added ammonium chloride has a favorable effect on the yields.

Accordingly, when the method of the present invention is employed, the aminocycloalkanone oxime can be recovered in yields of greater than about 80% with purity of at least about 90%.

Another advantage of this system is that both the ammonium sulfate or phosphate and the ammonium chloride co-product which are recovered are separately recovered in a relatively pure form. Since the ammonium phosphate or sulfate is removed in the early stages of the operation, such ammonium salt is uncontaminated by any chloride ions; when the ammonium chloride is subsequently produced during formation of the oxime, there are only trace amounts of sulfate or phosphate ions available for contamination since the solubility of the sulfate or phosphate ions in liquid ammonia is less than 0.5%.

The invention thus provides a method for producing a valuable lysine synthetic intermediate in which the reaction co-products have superior marketability.

BRIEF DESCRIPTION OF THE DRAWING

The FIGURE is a flowsheet representing a preferred embodiment of the continuous process of the present invention.

DESCRIPTION OF THE PREFERRED EMBODIMENTS

The novel process for the production of 2-aminocycloalkanone oxime according to the present invention may be expressed by the following equations, wherein the cycloalkanone is cyclohexanone and the hydroxylamine is used in the form of hydroxylamine sulfate:

$$(NH_2OH)_2H_2SO_4 + 2 NH_3 \longrightarrow 2 NH_2OH + (NH_4)_2SO_4$$

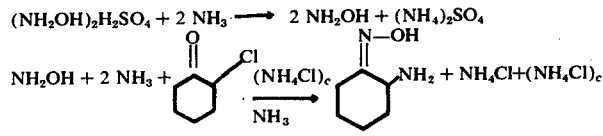

The 2-chlorocyclohexanone used as a starting material in the present invention may be prepared by chlorinating cyclohexanone using conventional methods.

Anhydrous ammonia is preferably used; however, a solution of ammonia containing less than 2 to 3% by weight water may also be employed.

It is important, to ensure high yields of the desired product, that ammonia and hydroxylamine should not contact the chlorocycloalkanone at an unfavorable low temperature; that the chlorocycloalkanone not contact either hydroxylamine or ammonia reactant in absence of the other; and that fresh incoming chlorocycloalkanone not contact a high concentration of the amino oxime product. Accordingly, the hydroxylamine salt and the ammonia are reacted prior to admixing with chlorocycloalkanone, in sufficient amounts to obtain the desired amount of free hydroxylamine base as a solution in ammonia while precipitating almost all the phosphate or sulfate ions present. All ammonia may be added initially or enough ammonia may be added initially to produce the free hydroxylamine and additional ammonia added later. Proportion of ammonia, we have found, affects both purity and yield of the product. In general, amounts of about 25 to 400 mols, preferably 90 to 200 mols, ammonia and about 1.0 to 1.3, preferably 1.05 to 1.2 mols hydroxylamine salt are employed per mol of chlorocycloalkanone.

Before admixing the solution containing hydroxylamine in ammonia with chlorocycloalkanone, the desired temperature is established in the ammonia solution to obtain favorable reaction temperature, allowing for the exothermic heat of reaction. An oxygen-free environment is maintained throughout the preparation of the ammonia solution and the subsequent reaction.

It is to be noted that the ammonium chloride could be added to the solution before removal of the ammonium sulfate but this would cause some contamination of the ammonium sulfate. Thus, at some point after removal of the precipitated ammonium salt at least about 0.2 and preferably not over 2 mols of NH_4Cl per mol chlorocycloalkanone are added to the free hydroxylamine base and ammonia. Amounts of NH_4Cl in excess of 2 mols may, of course, be used; however, no improvement in yield will result. The NH_4Cl may be added to the filtered hydroxylamine-ammonia reaction system and heated therewith or the NH_4Cl may be added in a separate stream to the preheated mixture simultaneously with addition of the chlorocycloalkanone. In either case, the NH$_4$Cl may be added alone or in an ammoniacal solution. In continuous operation, the NH$_4$Cl is readily obtained by recycle. In understanding the advantages inherent in the method of the present invention, it is important to realize that due to the solubility of NH$_4$Cl in NH$_3$, the presence of the NH$_4$Cl in the system does not interfere with precision in metering of the reaction streams or provide difficulties with plugging of valves and pumps as would be the case if ammonium sulfate or ammonium phosphate, which are relatively insoluble in ammonia, were left in the reaction mixture. Thus, by using the method disclosed herein, we have been able to eliminate the disadvantages of using a slurry of (NH$_4$)$_2$SO$_4$ 4(NH$_3$)$_3$PO$_4$ with the attendant difficulties in precise metering to reaction systems while still maintaining the beneficial effects of the NH$_4$+ ion.

In the continuous operation, the ammonia/hydroxylamine solution may be preheated to temperatures in the range of 60° to 105°C. in one vessel and the chlorocyclokanone may, if desired, be preheated in another. Then the separate streams of the reactants, including added ammonium chloride, are metered into a first reaction zone wherein temperatures, e.g. 80° to 120°C. are maintained, and are vigorously mixed until homogeneous and then allowed to react, preferably without back-mixing, until the extent of the reaction is 5 to 50% of completion. This handling of the reactants can be achieved by well-known means, such as by jetting intersecting streams of the reactants from the nozzles into a first reaction zone designed to produce plug-flow of the reaction mixture therein. The mixture is then passed out of the first zone into one or more succeeding zones from which back-mixing to the first zone is prevented, e.g. by baffles, while maintaining the mixture at the desired reaction temperature until the reaction is substantially complete. The purpose of this multizone reactor sequence is to minimize the extent to which backmixing of the incoming fresh chlorocycloalkanone with the already formed aminocycloalkanone oxime product ("ACO") may occur. This increases the probability of the desired interaction between the chlorocycloalkanone and the NH$_2$OH—NH$_3$ mixture as opposed to any secondary reactions.

The reaction time, which is dependent upon the temperature of the reactants, is a very brief period. When the temperature of the reactants is about 90°C., the reaction is substantially complete in 5 to 15 minutes. For lower temperature correspondingly longer times are employed. In general, in a continuous operation, the overall reaction time for passing the reaction mixture through all the reaction zones is not more than about 30 minutes. The mixture may be held at elevated temperatures for up to about 1 hour; however, retention of the mixture at elevated temperatures for longer than about 1 hour results in a substantial reduction in yield. The completion of the reaction may be determined by titration for ionic Cl— or by vapor chromatographic analysis for the amino-oxime.

Because decomposition of hydroxylamine is known to be catalyzed by trace metals, the use of glass lined or other non-corroding autoclaves may be desired; however, satisfactory yields are generally obtainable using ordinary materials of construction suitable for contact with hot ammonia.

The oxime product may be recovered from the system using a variety of methods. We have found that NH$_4$Cl is quantitatively precipitated from the reaction mixture by using a solvent for 2-aminocycloalkanone oxime such as isopropanol or dialkyl ethers of ethylene glycol, preferably dimethyl ethers of ethylene glycol, i.e. glyme in which NH$_4$Cl has low solubility. After elimination of all excess ammonia, the remaining solution can then be acidified with anhydrous HCl and the ACO separated as its hydrochloride. The isolation procedure described in U.S. Pat. No. 3,426,070 may also be used.

A flow sheet illustrative of a preferred embodiment of the continuous operation of the process of the present invention is shown in the attached FIGURE. Anhydrous hydroxylamine sulfate (stream 1) is fed to a stirred reactor-neutralizer I together with recycle ammonium chloride (stream 11) and liquid NH$_3$ (stream 8). This reaction yields ammonium sulfate (stream 2) which is filtered or otherwise separated in vessel or zone II and sent, as stream 3 to a dryer (not shown) where the last tractes of NH$_3$ are recovered. The filtrate from separator II contains anhydrous hydroxylamine base and liquid NH$_3$ and NH$_4$Cl. This stream 2A is preheated to a desired temperature $t_1$ such that $t_1 + \Delta t = t_r$ where $t_r$ is the desired reaction temperature that $\Delta t$ is the reaction exotherm. If necessary, additional cooling may be necessary to maintain the desired reaction temperature. This preheated stream 2A is now contacted with a chlorocycloalkanone (stream 5) in pressure mixer III where as much as 50% of the reaction may occur. Mixed stream 6 is then sent to at least one pressure reactor IV where the reaction is brought to substantial completion. Reactor IV may consist of one or a series of individual reaction vessels.

After cooling, the product mixture stream 7 resulting from the final reaction zone can be worked up in a number of ways one of which is illustrated by the dotted lines in the FIGURE. According to this embodiment, in a first separator, V, anhydrous NH$_3$ is recovered as stream 8 and is recycled to I after the addition of ammonia make-up stream 9. This can be achieved by flash evaporation for example. A solvent for ACO, such as dimethyl ether of ethylene glycol is added and the resulting slurry (stream 10) is conveyed to the next separation stage. In separator VI solid NH$_4$Cl is separated from the ACO extract. A portion of this NH$_4$Cl is recycled to I while the remaining NH$_4$Cl is sent to storage or used in another stage of lysine manufacture. The filtrate from the above operation (stream 13) contains ACO and by-products. A reagent capable of precipitating ACO selectively such as HCl or CO$_2$ is now added to separator VI and the ACO adduct separated as stream 15 while by-products and solvent in stream 14 are sent to solvent recovery and by-product disposal or upgrading.

The present invention is further illustrated by the following examples.

EXAMPLE I

The production of 2-aminocyclohexanone oxime in a batch process is illustrated by this example.

The reactor employed herein consists of a Parr Instrument Company stainless steel, self-sealing, oxygen combustion reaction vessel of approximately 360 ml capacity. The reaction vessel consisted of a cylinder, a head and screw cap. The head was fitted with a thermocouple well, a ball valve and, via a combination of two T's on the third head opening, with a pressure gauge, a rupture disc and a needle valve. All fittings were stainless steel.

A solution of free hydroxylamine in liquid ammonia was prepared by placing 8.56 g $(NH_2OH)_2 \cdot H_2SO_4$ in a pressure-resistant neutralizing vessel provided with an inlet valve and a filter in front of the outlet valve. After through evacuation of air, the neutralizing vessel was cooled to $-20°$ to $-30°C$. in a dry ice/acetone bath and 159 g anhydrous ammonia condensed in. The weight of the ammonia was determined by checking on a balance.

The reaction mixture was brought to room temperature and the outlet of the neutralizing vessel was connected to the above described reactor vessel to which had been charged 4.82 g $NH_4Cl$ with the reactor in a dry ice/acetone bath. The solution now containing 3.48 g free hydroxylamine base in 155.5 g ammonia was filtered and introduced to the precooled reactor via the neutralizing vessel filter outlet. The reactor thus charged was removed from the dry ice/acetone bath, placed in a warm (ca. 50°) water bath and the reaction mixture brought up to room temperpature while stirring with a magnetic stirring bar located within the reactor. The reactor at room temperature was placed in a heated silicone oil bath (about 125°C.) and with stirring, the $NH_2OH$—$NH_3$—$NH_4Cl$ solution was brought to about 80°C. over a period of about 16–18 mins. with the temperature being determined by a thermocouple inserted into the well of the reactor.

While the $NH_2OH$—$NH_3$—$NH_4Cl$ solution was being heated, a 75 ml stainless steel pressure vessel with a needle valve at one end and a ball valve at the other was charged with 12.68 g 2-chlorocyclohexanone and repeatedly evacuated with nitrogen. After the final nitrogen addition, the pressure vessel was weighed, pressurized with nitrogen to about 1000 psig and this vessel attached to the ball valve of the reactor. The valves were opened and the 2-chlorocyclohexanone rapidly added to the preheated $NH_2OH$—$NH_3$—$NH_4Cl$ mixture while stirring. An exothermic reaction occurred with a temperature rise of 12° in one minute after which the reaction was maintained at a constant temperature of 92°C by a silicone oil bath heated by a copper coil together with a Variac transformer and a Guardsman Temperature Controller. After a 15 minute reaction period, the reactor was removed from the heated bath, placed in a dry ice/acetone bath, cooled to below room temperature in one minute, and vented to remove ammonia over a period of 45–60 mins.

The reactor was opened, rinsed with 200 ml glyme and $NH_4Cl$ filtered off. The filtered solids were washed with 50 ml glyme. The combined $NH_4Cl$ filtrate and wash was evaporated in a Buchler rotating flash evaporator at reduced pressure to obtain about 100 ml of an ammonia-free concentrate.

The concentrate was poured into a 250 ml, round bottom flask containing a magnetic stirring bar. The evaporation flask was rinsed with a ca 50 ml of glyme and the rinse added to the concentrate. The stirred glyme concentrate was cooled in ice water, and a ca 2 N anhydrous HCl solution in glyme was added until a pH of 2 was shown on dry paper. The pH was then checked to ca. 3 with wet paper. Aminocyclohexanone oxime ("ACO") hydrochloride was precipitated.

The precipitated ACO hydrochloride was filtered on a 60 ml. medium fritted glass filter and washed on the fritted filter with ca 100 ml of glyme. The crude product was dried in the vacuum oven at a temperature of from room temperature to ca 40°C. 13.29 g ACO—HCl were thus recovered representing a yield of 85.3% of theory based on chlorocyclohexanone.

EXAMPLE 2

The procedure of Example 1 was repeated using 7.78 gms $(NH_2OH)_3 \cdot H_3PO_4$, 167 g $NH_3$, 13.13 g. chlorocyclohexanone and 6.18 g $NH_4Cl$. A yield of 86.4% ACO was thereby obtained.

EXAMPLE 3

The procedure of Example 1 can be carried out using molar equivalents of the following chloroalkanones instead of chlorocyclohexanone thereby producing the aminocycloalkanone oximes shown in Table I below:

Table I

| Chloro-ketone | Aminocycloalkanone oxime |
|---|---|
| 2—chlorocyclopentanone | 2—aminocyclopentanone oxime |
| 2—chlorocyclooctanone | 2—aminocyclooctanone oxime |
| 2—chlorocyclodecanone | 2—aminocyclodecanone oxime |
| 2—chlorocyclododecanone | 2—aminocyclododecanone oxime |

EXAMPLE 4

Reaction mixtures containing varying molar proportions of reactants were employed as in Example 1 with the chlorocyclohexanone added to the preheated hydroxylamine solution and the indicated reaction temperatures were maintained over various reacting times as shown in Table II below.

Table II

| $NH_2OH/NH_3/NH_4Cl$ Per mole Cl-one | Reaction Temperature | Time | Yield |
|---|---|---|---|
| 1.23/109/1.23 | 90–93 | 3 hours | 80.1% |
| 1.18/100/1.18 | 88–93 | 2 hours | 81.4 |
| 1.23/106/1.23 | 88–93 | 1 hour | 82.8 |
| 1.18/104/1.18 | 91–92 | 30 mins. | 85.1 |
| 1.18/103/1.18 | 91–93 | 15 mins. | 86.4 |
| 1.16/100/1.16 | 90–92 | 5 mins. | 83.7 |
| 1.07/101/1.07 | 91–93 | 15 mins. | 85.2 |
| 1.04/103/1.04 | 89–92 | 15 mins. | 84.6 |
| 1.08/103/1.08 | 93–95 | 15 mins. | 87.4 |

The following examples are presented to show the criticality of the various unique aspects of the present invention.

EXAMPLE 5

Showing the necessity for preheating the $NH_2OH$—$NH_3$—$NH_4Cl$ mixture before adding the chlorocloalkanone, the procedure of Example 1 was repeated; however the chlorocyclohexanone was added to the reaction mixture at room temperature and the entire mixture heated to 90°. The resulting yield was 67.4% as opposed to the 85–86% yield attained when the chlorocyclohexanone was added to the preheated mixture.

EXAMPLE 6

This example shows the improved yields attained by the addition of $NH_4Cl$ to the reaction mixture. The procedure of Example 1 was repeated using $(NH_2OH)_2 \cdot H_2SO_4$, without filtering off the $(NH_4)_2SO_4$; using $NH_2OH$ free base obtained after removal of $(NH_4)_2SO_4$ and using the free base plus varying amounts of $NH_4Cl$ as disclosed in the present invention. The results appear in Table III below.

Table III

| NH₂OH form | NH₄Cl added (mols) per mol of chlorocyclohexanone | Yield % of Theory |
|---|---|---|
| (NH₂OH)₂H₂SO₄ | 0 | 76 |
| NH₂OH free base | 0 | 72.8 |
| NH₂OH free base | .6 | 80.3 |
| NH₂OH free base | .9 | 83.7 |
| NH₂OH free base | 1.2 | 86.4 |
| NH₂OH free base | 2.27 | 84.9 |

As Table III indicates, the results obtained using relatively constant ratios of NH₂OH/2-chlorocycloalkanone/NH₃ at temperatures of 90°–95° for 15 minutes show that when hydroxylamine sulfate is used as the oximating agent and the ammonium sulfate produced is allowed to remain in the reaction mixture, the isolated yield of crude ACO.HCl was 76% while if the ammonium sulfate is removed, the yield, in the absence of any NH₄Cl, is reduced to 72.8%. It is postulated that due to the very low solubility of (NH₄)₂SO₄ in ammonia, a small amount of the (NH₄)₂SO₄ is dissolved to provide the ammonium ion resulting in a small improvement in yield over the free base. As indicated in Table III, optimum yields of ACO are attained using amounts of NH₄Cl in the range of about 1–2 mols per mol chlorocyclohexanone with amounts in excess of about 2 mols giving no improvement in yield.

EXAMPLE 7

This example shows the relationship between the reaction temperature and the yield of ACO.

The basic procedure described in Example 1 was repeated adding the chlorocyclohexanone to the preheated ammonia hydroxylamine solution and maintaining the reaction mixture at the indicated temperatures. The results at the completion of reaction are indicated in Table IV.

Table IV

| Reaction Temperature | % Yield |
|---|---|
| 25° | 33.9 |
| 60° | 67.6 |
| 80° | 80 |
| 90° | 86.4 |
| 100° | 83.7 |
| 110° | 88.1 |

These results indicate that reaction temperatures below about 80°C. are impractical and, at temperatures below about 60°, the yields are minimal.

EXAMPLE 8

This example shows the preferred mol ratio of NH₃ to the chlorocycloalkanone is at least about 90/1. Results are in Table V.

Table V

| Mol Ratio NH₃/Chlorocyclohexanone | % Yield |
|---|---|
| 39.6 | 79.1 |
| 50.0 | 76.3 |
| 96 | 85.3 |
| 103 | 86.4 |
| 164 | 84.4 |
| 195 | 86.6 |

We claim:

1. In a process for the production of 2-aminocycloalkanone oxime wherein hydroxylamine sulfate or hydroxylamine phosphate is admixed with substantially anhydrous ammonia, with exclusion of oxygen from the system, the improvement comprising:
   a. removing the precipitated insoluble ammonium salt which forms;
   b. adding to the remaining solution at least about 0.2 mol proportion of ammonium chloride;
   c. with continued exclusion of oxygen, maintaining the hydroxylamine/ammonia solution containing the ammonium chloride within a temperature range of about 60° to 120°C. while adding 1 mol proportion of 2-chlorocyclohexanone;
   d. establishing a reaction temperature in the range of about 80°–120°C. and maintaining the temperature within this range until the reaction is substantially complete; and
   e. recovering the resulting 2-aminocyclohexanone oxime reaction product.

2. The process of claim 1 wherein about 1.05–1.2 mols hydroxylamine, about 90–200 mols ammonia and about 0.2–2 mols ammonium chloride per mol 2-chlorocyclohexanone are present in the reaction mixture.

3. The process of claim 1 wherein the NH₄Cl added in step (b) is obtained from recycle of by-products obtained after step (e).

4. The process of claim 1 where the mixing operation of step (d) is carried out in a zone designed to produce plug flow of the resulting reaction mixture and the reaction is completed in a series of at least one additional zone wherein back mixing of the reaction mixture with incoming fresh chlorocyclohexanone, entering the first zone, is prevented.

5. In a process for converting 2-chlorocyclohexanone to the corresponding 2-aminocyclohexanone oxime by admixing hydroxylamine sulfate or hydroxylamine phosphate and liquid ammonia with the exclusion of oxygen thus forming (1) a precipitate of ammonia sulfate or ammonium phosphate, which is separated, and (2) a reactant solution containing hydroxylamine in free base form in liquid ammonia, which solution is thereafter admixed with chlorocyclohexanone reactant to form a reaction mixture in which temperature in the range of 0°–132°C. is established: the improvement which comprises adding to said solution, no later than when admixing it with the chlorocyclohexanone, at least about 0.2 mol of ammonium chloride per mol of 2-chlorocyclohexanone.

6. The process of claim 5 wherein prior to admixing the ammonia solution containing the hydroxylamine reactant with the chlorocyclohexanone reactant, temperature of about 60° to 105°C. is established in the solution and temperature in the range of about 80° to 120°C. is maintained throughout the subsequent reaction periods.

7. A continuous process for the production of α-aminocyclohexanone oxime comprising the steps of:
   a. admixing about 1.0 to 1.30 mol proportion of hydroxylamine sulfate or hydroxylamine phosphate with at least about 25 mol proportions of substantially anhydrous ammonia, with exclusion of oxygen from the system;
   b. removing the precipitated insoluble ammonium salt;
   c. adding to the remaining solution at least about 0.2 mol proportion of ammonium chloride;
   d. preheating the ammonia/hydroxylamine reactant solution to a temperature in the range of about 60° to 105°C.;
e. with continued exclusion of oxygen maintaining the hydroxylamine/ammonia solution containing the ammonium chloride within a temperature range of about 60°–105°C. while adding 1 mol proportion of 2-chlorocyclohexanone;
f. vigorously mixing the reactants until homogeneous in a first zone while maintaining temperature of the resulting mixture in the range of about 80°–120°C;
g. allowing the homogeneous mixture to react without back mixing until the extent of reaction is not more than 50% completion;
h. passing the reaction mixture out of the first zone into one or more succeeding zones wherein back mixing of the reaction mixture with the incoming fresh chlorocyclohexanone is prevented, and wherein the reaction mixture is maintained at temperature in the range of about 80° to 120°C. until the reaction is substantially complete;
i. adding the solvent for 2-aminocyclohexanone oxime in which ammonium chloride has only low solubility;
j. separating solid ammonium chloride from the product solution; and
k. recycling at least a portion of the separated ammonium chloride for addition to the reactant solution containing hydroxylamine in liquid ammonia.

8. The process of claim 7 wherein the overall reaction time for passing the reaction mixture through all the reaction zones is not more than 30 minutes.

* * * * *